April 9, 1963 B. G. OLSSON 3,085,164
AMPLIFIER HAVING CONSTANT SINUSOIDAL OUTPUT VOLTAGE
WHICH IS RELATIVELY INDEPENDENT OF INPUT SHAPE
Filed March 16, 1959

INVENTOR
BENGT GUSTAV OLSSON
BY Hane and Nydick
ATTORNEYS

United States Patent Office 3,085,164
Patented Apr. 9, 1963

3,085,164
AMPLIFIER HAVING CONSTANT SINUSOIDAL OUTPUT VOLTAGE WHICH IS RELATIVELY INDEPENDENT OF INPUT SHAPE

Bengt G. Olsson, Stockholm-Bandhagen, Sweden, assignor to Telefonaktiebolaget L M Ericsson, Stockholm, Sweden, a corporation of Sweden Filed Mar. 16, 1959, Ser. No. 799,543
Claims priority, application Sweden Mar. 21, 1958
2 Claims. (Cl. 307—88.5)

The present invention refers to an amplifier device comprising at least one transistor.

The object of the invention is to supply an amplifier of said kind, which has a high efficiency (that is a small loss power in the transistor), constant sinusoidal output voltage, which is relatively independent of the curve shape of a fed control voltage, a low output impedance and a small reaction on the voltage of the battery driving the amplifier.

An amplifier device according to the invention is characterized by a tuned circuit, a coil and a diode acting element being arranged on the output side of the transistor, which are mutually connected in such a way that on one hand the tuned circuit through the coil is connected to a voltage source necessary for the operation of the amplifier, and on the other hand the diode acting element in series with the coil is conducting when the transistor is non-conducting and vice versa.

At such an amplifier device the voltage through the transistor, that is the voltage through the emitter and the collector of the transistor, will be very small during the conducting state of the transistor, and the output impedance will thereby be low.

Figure 1:
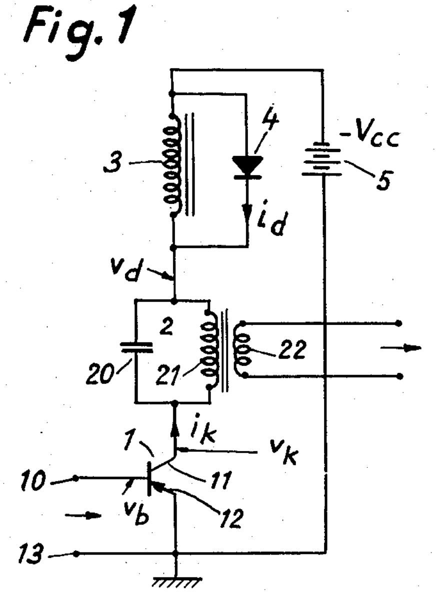
Figure 2:
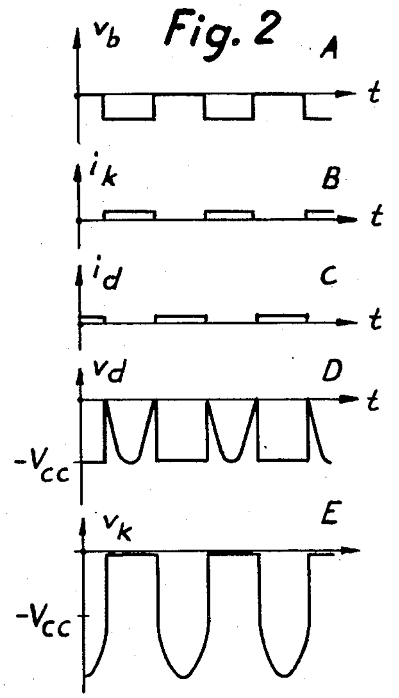
Figures 3, 4:
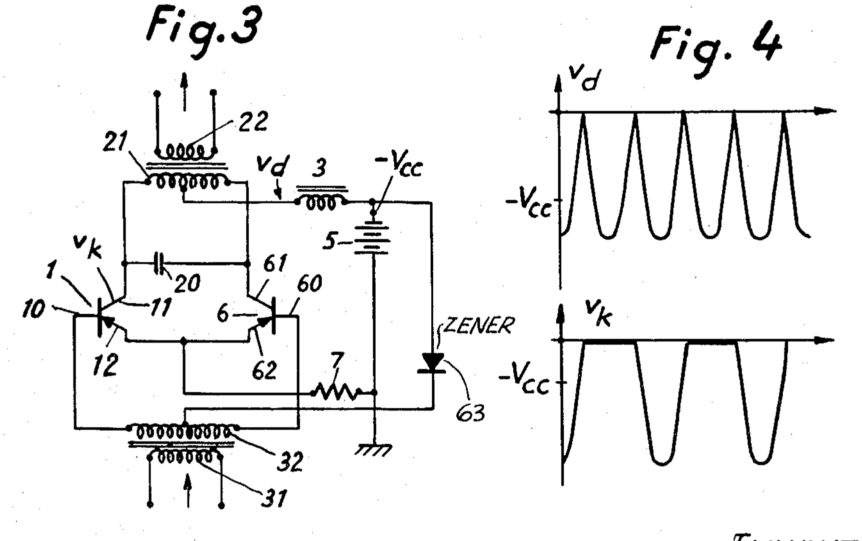

The invention will be more detailed described in connection to the attached drawing, where FIG. 1 shows an amplifier device according to the invention, FIG. 2 shows some current- and voltage-curves for the device according to FIG. 1, FIG. 3 shows a modification of the device according to FIG. 1, and FIG. 4 shows two voltage curves for the device according to FIG. 3.

In FIG. 1 the reference 1 designates a transistor, on the output side of which a tuned circuit, a coil 3 and a diode acting element 4 are arranged. The tuned circuit 2, which comprises a condenser 20 connected in parallel with the primary winding 21 of an output transformer 21—22, is connected through the coil 3 to the negative pole of a voltage source 5, the positive pole of which is connected to the earthed emitter 12 of the transistor 1. The diode acting element 4 is connected directly through the coil 3 with the pass direction against the tuned circuit 2.

The operation of the device now described will be explained by means of the curves in FIG. 2.

To the input circuit of the device, that is to the input terminals 10 and 13 connected to the base respectively earth of the transistor 1, an impulse train $v_b$ of negative impulses is fed, see FIG. 2A. These impulses must have such a great amplitude that the transistor 1 will be overdriven and it gets then a collector current $i_k$ according to FIG. 2B. The tuned circuit 2 is supposed to be tuned to a frequency corresponding to the pulse repetition frequency of the impulse train $v_b$. During the interruption in the collector current $i_k$ the coil 3 causes a current $i_d$ through the diode acting element 4, see FIG. 2C, and the coil is so large that this current does not cease during a period of the sinusoidal output voltage. The voltage $v_d$ through the coil 3, that is the potential in the interconnecting point between the coil 3 and the tuned circuit 2, is shown in FIG. 2D. It is sinusoidal during periods when the collector current flows and for the rest constant equal to $-V_{cc}$, which is the potential of the negative pole of the voltage source 5. The tuned circuit 2 causes in the secondary winding a sinusoidal voltage, and a voltage $v_k$ is then obtained through the transistor 1, which voltage during periods when the collector current flows, is mainly constant and very low, and thereby the power $v_k.i_k$ generated in the transistor will also be low. The effective value of the voltage across the tuned circuit 2 will be $V_{cc}/\sqrt{2}$ and the amplitude value of the collector voltage $v_k$ will be $V_{cc}.\sqrt{2}$. With a resistance and a parallel connected condenser in series with the element 4 said values can be inserted to $V_{cc}.\sqrt{2}$ respectively $V_{cc}.2.\sqrt{2}$.

The diode acting element 4 shown in FIG. 1 is schematically indicated as an ordinary rectifier. It can, however, consist of, for instance, a transistor and this case is shown in FIG. 3.

The device according to FIG. 3 includes, as the device according to FIG. 1, a transistor 1, an output transformer 21—22, a coil 3 and a voltage source 5. The diode acting element consists here of another transistor 6, and the emitters 12 and 62 of the two transistors are thereby connected to each other, and their collectors 11 and 61 are connected to each other across the primary winding 21 of the output transformers 21—22, the middle point of which is connected through the coil 3, the voltage source 5 and a resistance 7 to the interconnected emitters. The base electrodes 10 and 60 of the two transistors are connected to each other across the secondary winding 32 of the input transformers 31—33, the middle point of which is connected through a voltage stabilizing zener-diode 63 to the connection point between the coil 3 and the voltage source 5.

The operation of the described device is in principle analogous to the earlier described one, and therefore only two voltage curves, namely the voltage $v_d$ across the coil 3 and the voltage $v_k$ across the transistor 1, are shown in FIG. 4. In this case also the voltage $v_k$ is mainly constant and very low during periods when the collector is current carrying, and therefore the power generated in the transistor will also here be low.

Many modifications of the now shown amplifier devices may be used without exceeding the scope of the invention idea. It ought to be said that an amplifier according to the invention in a way known in itself can be connected so that it works as an oscillator.

I claim:

1. An amplifier comprising, in combination, a transistor including an emitter electrode, a collector electrode and a base electrode, a tuned circuit, a coil means, a unidirectionally conducting circuit means, a D.C. voltage source, said coil means, said tuned circuit and said transistor being connected in series across the terminals of said voltage source and said unidirectional conducting circuit means being connected to said coil means, an output transformer having a primary and a secondary winding, said unidirectionally conducting circuit means including a second transistor having an emitter electrode, a collector electrode and a base electrode, the emitter electrodes of said transistors being directly connected to each other and the collector electrodes being connected across said primary winding, said primary winding being a part of said tuned circuit, an input transformer having a primary and a secondary winding, the base electrodes of said transistors being across the secondary winding of said input transformer, the pass direction of said unidirectionally conducting circuit means being such that the same is conducting when the first mentioned transistor is non-conducting and vice versa.

2. An amplifier according to claim 1 and comprising a Zener diode, the midpoint of the secondary winding of said input transformer being connected through said Zener diode to the connection between the coil means and the voltage source.

References Cited in the file of this patent

UNITED STATES PATENTS

| | | |
|---|---|---|
| 2,852,730 | Magnuski | Sept. 16, 1958 |
| 2,881,310 | Holmes | Apr. 7, 1959 |